United States Patent [19]

Wakamori et al.

[11] Patent Number: 4,522,534
[45] Date of Patent: Jun. 11, 1985

[54] CONTROL METHOD FOR OPEN CHANNEL

[75] Inventors: Fumio Wakamori, Machida; Toshiyuki Noma, Ibaraki; Masao Adachi, Yokohama; Motohisa Funabashi, Sagamihara; Masayoshi Suzuki, Hitachi, all of Japan

[73] Assignee: Hitachi, Ltd., Tokyo, Japan

[21] Appl. No.: 577,971

[22] Filed: Feb. 8, 1984

[30] Foreign Application Priority Data

Feb. 23, 1983 [JP] Japan .................................. 58-27561

[51] Int. Cl.³ .............................................. E02B 13/00
[52] U.S. Cl. ...................................... 405/37; 405/52; 405/92
[58] Field of Search .................................... 405/36–41, 405/52, 53, 92, 80

[56] References Cited

U.S. PATENT DOCUMENTS 4,180,348 12/1979 Taylor .............................. 405/37 X

FOREIGN PATENT DOCUMENTS

| 499378 | 3/1976 | U.S.S.R. | 405/37 |
| 510696 | 8/1976 | U.S.S.R. | 405/37 |
| 589331 | 1/1978 | U.S.S.R. | 405/37 |
| 607194 | 5/1978 | U.S.S.R. | 405/37 |
| 817135 | 3/1981 | U.S.S.R. | 405/37 |

Primary Examiner—Dennis L. Taylor
Attorney, Agent, or Firm—Antonelli, Terry & Wands

[57] ABSTRACT

A control method for an open channel for obtaining a stable condition of flow of water by coping with a transient change therein, comprising the steps of representing each space divided by gates of the open channel by a three water tank model including three imaginary water tanks in series and two imaginary conduits connecting the imaginary water tanks with each other; solving this model so as to obtain estimated future values of parameters of a state of the open channel; and determining a degree of opening of each gate so as to keep a liquid level of the space constant on the basis of the estimated future values of the parameters.

6 Claims, 4 Drawing Figures

CONTROL METHOD FOR OPEN CHANNEL

BACKGROUND OF THE INVENTION

1. Field of the Invention

This invention relates to a control method for an open channel of a single stage or a plurality of stages in which the condition of water flowing therethrough undergoes a transient change due to variations in a flow rate of diverted water from each stage or reach of the open channel, the term "reach" meaning each space defined between two gates of the open channel.

2. Description of the Prior Art

In various types of water supply, particularly a supply of water for irrigation purposes, the flow rate of diverted water from each reach of an open channel would show a variation due to fluctuations in the demand for water which would be caused to occur irregularly from time to time by weather conditions or other factors. It is impossible to directly measure such variations. A water supply through an open channel is controlled for the purpose of providing the open channel with a stable water flow condition free from the risks of overflow while ensuring that a flow rate of water large enough to meet the demand flows through the open channel by adjusting for fluctuations in demand.

Heretofore, it has been usual practice to use a control method wherein the relation between the liquid level in a reach and the degree of opening of a gate is represented by using a simple model, or a "first order lag plus dead time" system and expressed by using a transfer function, so as to control the water flow to keep the liquid level constant. This method of control has suffered the disadvantage that, when the flow condition of water through the open channel shows a great transient change due to variations in the flow rate of diverted water, the model shows a large error and it becomes impossible to control the flow condition of water in a manner to enable the aforesaid purpose.

To serve the aforesaid purpose, one would have to collect information on the transient condition of the flow of water through the open channel from moment to moment. If the prior art were intended to obtain with a high degree of precision the transient condition of water flow through the open channel, the following equations would have to be solved:

Equation of motion $$\frac{\partial V}{\partial t} + V\frac{\partial V}{\partial x} + g\frac{\partial h}{\partial x} = g\left(i - \frac{n^2|V|V}{R^{4/3}}\right)$$

Equation of continuity $$\frac{\partial A}{\partial t} + \frac{\partial Q}{\partial x} = 0$$

where
V: flow velocity.
Q: flow rate.
h: depth of water.
R: hydraulic radius.
n: roughness coefficient.
A: cross-sectional area of channel.
i: gradient of bottom.
g: graviational acceleration.

These equations should be solved numerically because it is impossible to solve them analytically. The calculation involved is referred to as an indefinite flow calculation and requires a great number of calculations to be performed by using a large computer. Because of this, it has hitherto been impossible, due to limitations placed by calculation times, to obtain the transient condition of flow of water through an open channel by applying the indefinite flow calculation directly to on-line processing.

SUMMARY OF THE INVENTION

This invention has been developed for the purpose of obviating the aforesaid disadvantage of the prior art. Accordingly, the invention has as its object the provision of a control method for an open channel wherein the need to perform extensive calculations for estimation of transient changes in the condition of flow of water through the open channel caused by fluctuations in the demand for water can be reduced to such an extent that on-line processing can be used for effecting control of the open channel with a high degree of precision.

To accomplish the aforesaid object, the invention provides the outstanding characteristic that a three water tank model in which three imaginary water tanks are connected in series with one another is used for representing the transient condition of an open channel and six variables including liquid levels of the three imaginary water tanks, flow rates of water flowing through passages in two imaginary conduits and a flow rate of diverted water are used as parameters of a state, the liquid levels of the upstream imaginary water tank and downstream imaginary water tank being actually observable, so that the transient condition of the open channel can be obtained with a high degree of precision by successively estimating values of these parameters of a state on the basis of the values obtained by observing the gate liquid levels in real time.

BRIEF DESCRIPTION THE DRAWINGS

FIG. 1 a view in explanation of a control method for an open channel of the prior art; and FIGS. 2 and 3 are views in explanation of the control method for an open channel comprising one embodiment of the invention.

DETAILED DESCRIPTION OF THE PREFERRED EMBODIMENT

Figure 1:
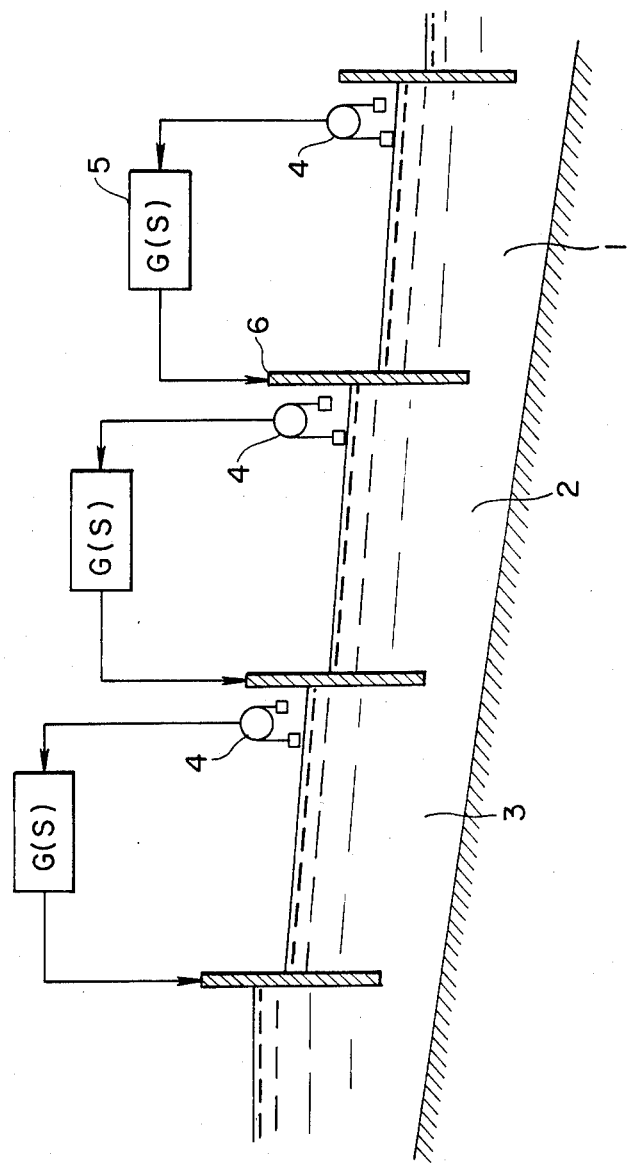

Before describing the invention in detail, a control method for an open channel of the prior art will be outlined. In FIG. 1, liquid levels of reaches 1-3 are each measured by a liquid level indicator 4, and each gate 6 is controlled by each control 5 on the basis of the observed liquid level so as to keep the liquid level constant. The relation between a degree of opening of the gate and the observed liquid level is represented by a simple model such as a "first order lag plus dead time" system, and the control characteristic is defined as a transfer function G(s). Thus, if the condition of flow of water through the open channel undergoes a great transient change due to variations in the flow rate of diverted water, the model would have a big error.

Figure 2:
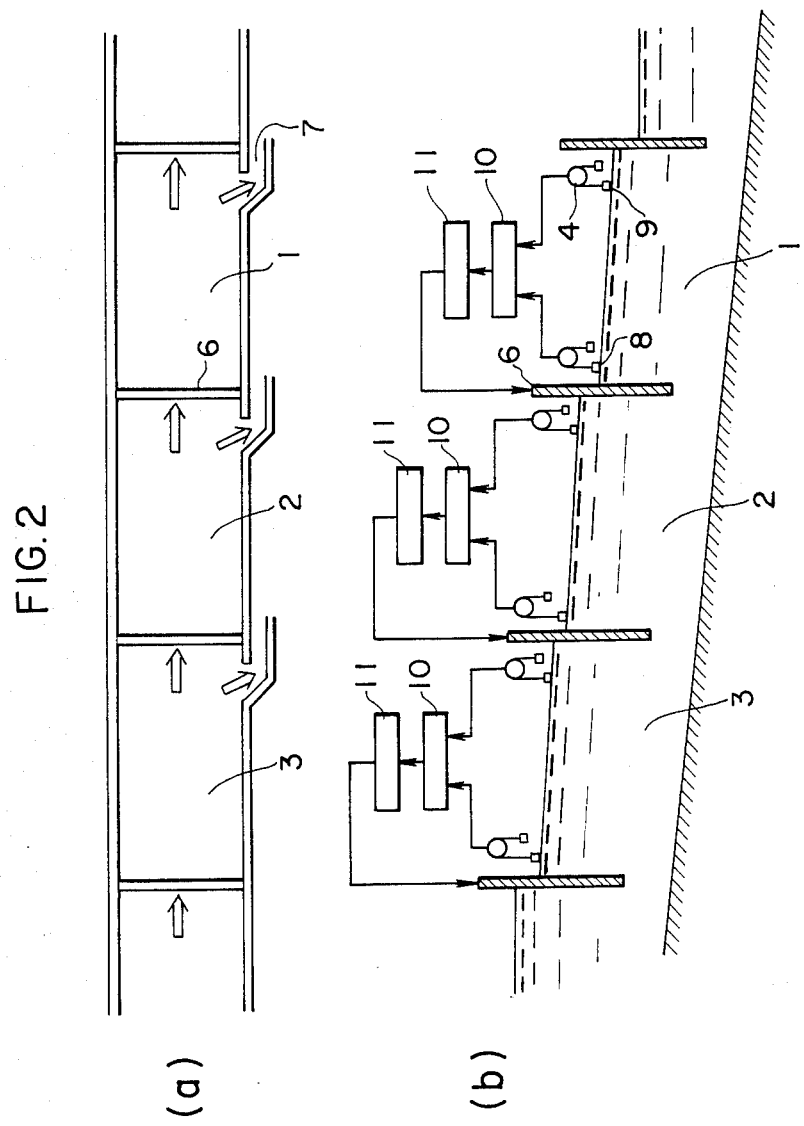

A preferred embodiment of the control method for an open channel in conformity with the invention which is developed for obviating the aforesaid problem will be described in detail by referring to FIGS. 2 and 3. Referring to FIG. 2, an upstream side liquid level 8, a downstream side liquid level 9 and a flow rate of diverted water at a branch 7 are measured for each of reaches 1-3, and under-mentioned estimated values of the parameters of a state of each of the reaches 1-3 are obtained in a state estimating section 10 of each reach on the basis of the data obtained by the aforesaid measurements. Based on the estimated values of the parameters of a state, a degree of opening of each gate 16 is determined by a control 11.

Figure 3:
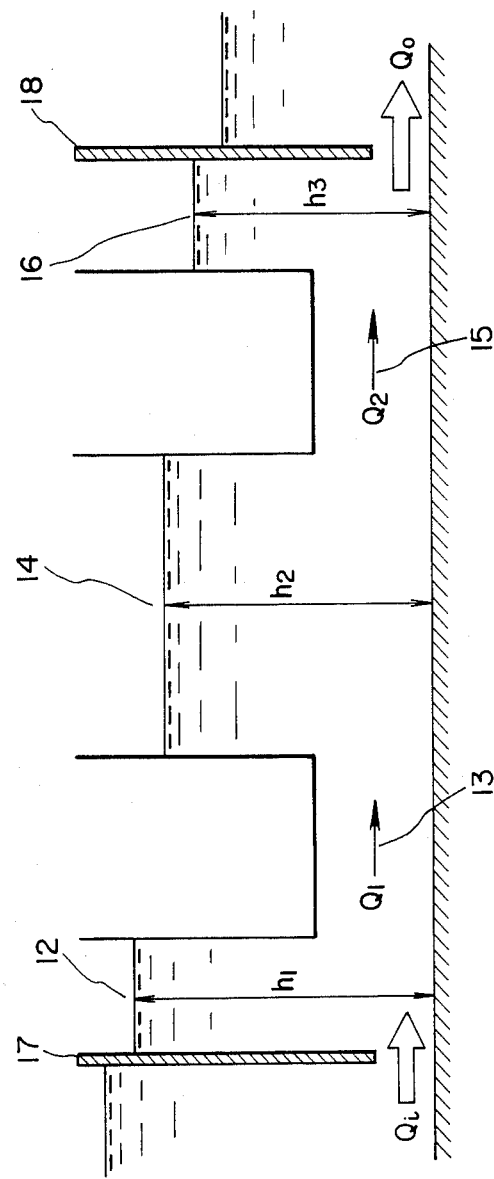

In the state estimating section 10, each of the reaches 1-3 is assumed to be represented by a three water tank model as shown in FIG. 3. An inflow rate $Q_i$ through an upstream side gate 17 and an outflow rate $Q_o$ through a downstream side gate 18 are measured and set as boundary conditions. Model equations for the six parameters of a state, i.e. a liquid level $h_1$ of an upstream side imaginary water tank 12, a liquid level $h_2$ of an intermediate imaginary water tank 14, a liquid level $h_3$ of a downstream side imaginary water tank 16, a flow rate $Q_1$ of water flowing through an imaginary conduit (hereinafter called first imaginary conduit) 13 interconnecting the upstream side imaginary water tank 12 and the intermediate imaginary water tank 14, a flow rate $Q_2$ of water flowing through an imaginary conduit (hereinafter called second imaginary conduit) 15 interconnecting the intermediate imaginary water tank 14 and the downstream side imaginary water tank 16, and a flow rate of diverted water q, are as follows:

$$\dot{h}_1 = (Q_i - Q_1)/F_1$$

$$\dot{Q}_1 = (gf_1/L_1)(h_1 - h_2 - C_1 Q_1^2)$$

$$\dot{h}_2 = (Q_1 - Q_2)/F_2$$

$$\dot{Q}_2 = (gf_2/L_2)(h_2 - h_3 - C_2 Q_2^2)$$

$$\dot{h}_3 = (Q_2 - Q_0 - q)/F_3$$

$$\dot{q} = \alpha(q^0 - q)$$

where $F_1$: horizontal area of upstream side imaginary water tank.
$F_2$: horizontal area of intermediate imaginary water tank.
$F_3$: horizontal area of downstream side imaginary water tank.
$L_1$: length of first imaginary conduit.
$L_2$: length of second imaginary conduit.
$f_1$: sectional area of first imaginary conduit.
$f_2$: sectional area of second imaginary conduit.
$C_1$: friction coefficient of first imaginary cunduit.
$C_2$: friction coefficient of second imaginary conduit.
$q^0$: scheduled flow rate of diverted water.
$\alpha$: constant.
g: gravitational acceleration. The symbol "·" above the parameters of a state expresses a differential with respect to time. The friction coefficient of the imaginary conduit is calculated by the following equation:

$$C = (n^2 L)/(R^{4/3} f^2)$$

where
n: roughness coefficient.
R: hydraulic radius.
L: length of imaginary conduit.
f: cross-sectional area of imaginary conduit.

Also, the ratios of the lengths of the imaginary conduits $L_1$ and $L_2$ to the horizontal areas $F_1$, $F_2$ and $F_3$ respectively are determined in such a manner that they can represent the characteristics of the open channel, such as the dynamic characteristics of liquid level gradient and changes in liquid level, by carrying out a simulation of the operation of the open channel.

If the six parameters are solved, the future state of the water flow can be estimated on the basis of the present state.

Referring to the model equations, the parameters to be solved are $h_1$, $h_2$, $h_3$, $Q_1$, $Q_2$ and q. $Q_i$ and $Q_0$ are measured every moment. $F_1$, $F_2$, $F_3$, $L_1$, $L_2$, $f_1$, $f_2$, $C_1$ and $C_2$ are predetermined by carring out the simulation of the open channel.

The flow rate q of the diverted water is controlled at the diverted water channel. However, the flow rate q of the diverted water is under fluctuations in the transient state. The last equation of the model equations shows controlling of the flow rate of the diverted water. The constant $\alpha$ is positive. The flow rate q of the diverted water is controlled toward the scheduled flow rate $q^0$. That is, when q is smaller than $q^0$, $\dot{q}$ becomes positive and q is increased by adjusting flow regurating means (not shown). If the flow rate of the diverted water q is solved by using the moel equations, the future flow rate q of the diverted water can be estimated on the basis of the present state, so that the degree of opening of the each gate can be controlled sufficiently in view of the estimated future flow rate of the diverted water.

The liquid levels are measured near the upstream side gate 17 and the downstream side gate 18, with obtaining observed values y1 and y2. However, the observed values y1 and y2 include errors especially in the transient state. Assume that the observed values y1 and y2 include only complete random errors v1 and v2 which conform to the "normal distribution" and called the white noises. Thus, the real liquid levels h1 and h2 to be estimated are difined by the following observation equations:

$$y1 = h1 + v1$$

$$y2 = h3 + v2$$

The model equations and the observation equations are solved by using a "Kalman filter method" (see "Kalman filter" by Taku Arimoto issued by Sangyo Tosho Company in 1977). Non-linear terms involved in the second and fourth equations of the model equations must be linearized so that the Kalman filter method can be applied for the model equations. In addition, the white noises v1 and v2 need not be concretely decided, but there need be determined only an average and a variance of the normal distribution of the each white noise. The average is normally assumed to be zero and the variance is predetermined on the basis of experiment and simulation.

After solving the six parameters by using the model equations, the observation equations, and the Kalman filter method, the future values of the six parameters can be estimated on the basis of the present state. Furthermore, the gates of the open channel can be controlled on the basis of the estimated future values of the six parameters. For example, increase and decrease of a water amount in the reach can be estimated on the basis of the estimated future flow rate q of the diverted water. A volume increase V of water in the reach from t=0 (present) to t=t (future) is $$V = \int_o^t (Q_i - Q_o - q)dt$$

When V is positive, the upstream side gate 17 is controlled to be less opened so as to effect a less flow rate of the inflow to the reach. Whereas, when V is negative, the upstream side gate is controlled to be more opened so as to effect a larger flow rate.

In case of fluctuations in demand for water, the scheduled flow rate $q^0$ of the diverted water is changed to an appropriate value sufficient to satisfy the demand. Then, the flow rate q of the diverted water and other parameters of the state of the open channel are to be in the transient state. According to the present invention, the flow rate q and other parameters in the near future can be estimated even in the transient condition, so that the gates of the open channel can be controlled in view of the future state of the channel.

In the embodiment shown and described hereinabove, each of the reaches 1-3 is expressed by six parameters of a state, and the number of calculations performed is smaller than in indefinite flow calculation. This makes it possible to perform operations of the open channel by utilizing an on-line processing, and to estimate the flow rate of diverted water which, although it is impossible to directly observe, might cause disturbance to the open channel.

The state estimating section 10 and control 11 may be provided by utilizing a known microprocessor.

From the foregoing description, it will be appreciated that the method according to the invention enables estimation of the transient condition of water flow through an open channel with respect to variations in the flow rate of diverted water to be made with a high degree of precision by performing a smaller number of calculations than in the prior art and allows a propagated delay in the change in liquid level on the downstream side (or the upstream side) to be expressed, so that it is possible for the method to effect control of an open channel showing great variations in the flow rate of diverted water to obtain a stable condition of flow of water. Also, by using suitable coefficients (e.g. the ratios of the lengths of imaginary conduits to the horizontal areas of imaginary tanks) for the model, it is possible for the method of control according to the invention to represent characteristics of an open channel under various conditions, thereby making the control method adaptable to many uses.

What is claimed is:

1. A control method for an open channel performed by using an open channel control system comprising gate means for opening and closing the open channel, estimating means for estimating values of parameters of a state in a plurality of reaches into which the open channel is divided by said gate means, and control units for controlling a degree of opening of the gate means on the basis of estimated values of the parameters of a state, such method comprising the steps of:

representing each of the reaches by a three water tank model comprising three imaginary water tanks connected in series with one another and two imaginary conduits connecting the two adjacent imaginary water tanks with each other;

selecting, as the parameters of a state, liquid levels of the imaginary water tanks, flow rates in the imaginary conduits and a flow rate of diverted water from the reach;

providing the three water tank model with equations including the selected parameters of a state;

estimating, in the estimating means, future values of the selected parameters of a state by solving the equations;

determining, in the control unit, the degree of opening of the gate means so as to keep a liquid level of the reach constant on the basis of the estimated future values of the selected parameters of a state.

2. A control method as claimed in claim 1, wherein said selected parameters of a state are liquid levels of the imaginary water tanks, flow rates of water flowing through the imaginary conduits and a flow rate of diverted water from the reach.

3. A control method as claimed in claim 2, wherein liquid levels of an upstream side and a downstream side imaginary water tanks are observed every moment, but each observed liquid level is assumed to include a complete random error which conforms to a normal distribution.

4. A control method as claimed in claim 3, wherein the equations including the selected parameters are solved by using a Kalman filter method.

5. A control method as claimed in claim 4, wherein the flow rate of diverted water is controlled toward a scheduled flow rate by flow regulating means provided on a diverted water channel, the scheduled flow rate being determined in view of fluctuations in demand for water.

6. A control method as claimed in claim 5, wherein a volume increase of water in the reach from present to future is calculated by using an estimated future value of the flow rate of diverted water, and the gate means of the open channel are controlled in dependence upon the volume increase.

* * * * *